(12) United States Patent
Kishimoto et al.

(10) Patent No.: US 8,807,812 B2
(45) Date of Patent: Aug. 19, 2014

(54) LIGHT EMITTING DEVICE, ILLUMINATING DEVICE, AND HEADLAMP

(75) Inventors: Katsuhiko Kishimoto, Osaka (JP); Shigetoshi Ito, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 177 days.

(21) Appl. No.: 13/362,815

(22) Filed: Jan. 31, 2012

(65) Prior Publication Data

US 2012/0195057 A1    Aug. 2, 2012

(30) Foreign Application Priority Data

Feb. 2, 2011    (JP) ................................. 2011-021083

(51) Int. Cl.
*F21V 7/04* (2006.01)
*F21S 8/10* (2006.01)
*G03B 21/20* (2006.01)

(52) U.S. Cl.
CPC ........... *F21S 48/1159* (2013.01); *G03B 21/204* (2013.01); *F21S 48/1241* (2013.01)
USPC ............ 362/555; 362/551; 362/554; 362/556

(58) Field of Classification Search
USPC ............................................... 362/551–582
See application file for complete search history.

(56) References Cited

U.S. PATENT DOCUMENTS

| 7,784,977 | B2* | 8/2010 | Moolman et al. ............. 362/298 |
| 2005/0105301 | A1* | 5/2005 | Takeda et al. ................. 362/545 |
| 2009/0052189 | A1* | 2/2009 | Kon ......................... 362/296.01 |
| 2010/0091396 | A1* | 4/2010 | Hutson et al. ................ 359/641 |

FOREIGN PATENT DOCUMENTS

| JP | 4-73801 | 3/1992 |
| JP | 7-318998 | 12/1995 |
| JP | 2003-295319 | 10/2003 |
| JP | 2004-241142 | 8/2004 |
| JP | 2004-327361 | 11/2004 |
| JP | 2004-354495 | 12/2004 |
| JP | 2005-150041 | 6/2005 |
| JP | 2006-253019 | 9/2006 |
| JP | 2007-173177 | 7/2007 |
| JP | 2008-234908 | 10/2008 |
| JP | 2010-153241 | 7/2010 |

* cited by examiner

*Primary Examiner* — William Carter
(74) *Attorney, Agent, or Firm* — Morrison & Foerster LLP

(57) ABSTRACT

A light emitting device of the present invention includes: an LD chip for emitting excitation light; a light emitting body for emitting fluorescence upon irradiation with the excitation light from the LD chip; and a mirror including a light reflecting concave surface for reflecting the fluorescence from the light emitting body, the light reflecting concave surface of the mirror having a through-hole at a region other than a bottom region in the vicinity of the bottom of the light reflecting concave surface, and a truncated pyramid light converging section being inserted into the through-hole in order to guide the excitation light from the LD chip to the light emitting body.

11 Claims, 6 Drawing Sheets

LIGHT EMITTING DEVICE, ILLUMINATING DEVICE, AND HEADLAMP

This Nonprovisional application claims priority under 35 U.S.C. §119(a) on Patent Application No. 2011-021083 filed in Japan on Feb. 2, 2011, the entire contents of which are hereby incorporated by reference.

TECHNICAL FIELD

The present invention relates to a light emitting device etc. including a light emitting body including a fluorescent material which emits fluorescence upon irradiation with excitation light.

BACKGROUND ART

In recent years, studies have been intensively carried out for a light emitting device that uses, as illumination light, fluorescence emitted from a light emitting body which includes fluorescent material. The light emitting body emits the fluorescence upon irradiation with excitation light, which excitation light is emitted from an excitation light source. A semiconductor light emitting element is used as the excitation light source, such as a light emitting diode (LED), a laser diode (LD), or the like.

Examples of such a conventional light emitting device are a light emitting device disclosed in Patent Literature 1 and a lamp disclosed in Patent Literature 2.

The light emitting device and the lamp are designed such that at least one opening is provided in the vicinity of a bottom of a reflection mirror (concave mirror) and laser light is emitted to a fluorescent material via the opening.

CITATION LIST

Patent Literatures

Patent Literature 1
Japanese Patent Application Publication, Tokukai, No. 2003-295319 A (Publication Date: Oct. 15, 2003)
Patent Literature 2
Japanese Patent Application Publication, Tokukai, No. 2005-150041 A (Publication Date: Jun. 9, 2005)
Patent Literature 3
Japanese Patent Application Publication, Tokukai, No. 2004-241142 A (Publication Date: Aug. 26, 2004)

SUMMARY OF INVENTION

Technical Problem

However, since the light emitting device of Patent Literature 1 and the lamp of Patent Literature 2 are designed such that an opening is provided in the vicinity of a bottom of a concave mirror which bottom includes a position at which the efficiency in extracting fluorescence (illumination light) emitted from the fluorescent material is highest, and consequently the light emitting device and the lamp suffer a problem of decrease in the efficiency in extracting illumination light in the vicinity of the bottom of the reflection mirror. In particular, in the case of the lamp of Patent Literature 2 in which a plurality of openings are provided in the vicinity of a reflection mirror, the efficiency in extracting illumination light in the vicinity of the bottom of the reflection mirror decreases as the number of openings increases.

A headlamp disclosed in Patent Literature 3 is designed not to have a large part of a bottom of a concave mirror which bottom includes a position at which the efficiency in extracting (illumination light) is the highest.

In the above, an explanation was made as to a region in the vicinity of a bottom of a concave mirror as an example of a region including a position at which luminous flux from a light emitting body is incident to a reflection mirror with the highest density (i.e. at which illuminance is highest). It should be noted that since the position of such a region is variable depending on the shape of a reflection mirror, the positional relationship between the reflection mirror and a light emitting body etc., the region including a position at which luminous flux from a light emitting body is incident to a reflection mirror with the highest density is not limited to the region in the vicinity of the reflection mirror.

The present invention was made in view of the foregoing problem. An object of the present invention is to provide a light emitting device etc. capable of subduing decrease in the efficiency in extracting illumination light from a region including a position at which luminous flux from a light emitting body is incident with the highest density.

Solution to Problem

In order to solve the foregoing problem, a light emitting device of the present invention includes: an excitation light source for emitting excitation light; a light emitting body for emitting fluorescence upon irradiation with the excitation light from the excitation light source; and a reflection mirror including a light reflecting concave surface for reflecting the fluorescence from the light emitting body, the light reflecting concave surface of the reflection mirror having a through-hole at a region other than a high-illuminance region in the vicinity of a position where fluorescence from the light emitting body is incident with highest illuminance, and a light guiding member being inserted into the through-hole in order to guide the excitation light from the excitation light source to the light emitting body.

It is considered that making as good as possible use of reflection at a region of a reflection mirror at which region luminous flux from a light emitting body is incident with higher density (i.e. with higher illuminance) than other region (high-illuminance region) results in increase in efficiency in extracting fluorescence from a device as a whole.

Typical examples of such a high-illuminance region are regions in the vicinity of bottoms of concave mirrors of the light source device of Patent Literature 1 and the lamp of Patent Literature 2. For example, assume that a structure of these techniques in which a through-hole is provided at the high-illuminance region is designed to have a light guiding member inserted into the through-hole. Such a structure could not sufficiently use reflection at the high-illuminance region where efficiency in extracting fluorescence (illumination light) is high.

In order to deal with this problem, the light emitting device of the present invention is designed such that a through-hole is provided at a region outside the high-illuminance region.

Further, needless to say, the light emitting device of the present invention can subdue reduction in efficiency in extracting illumination light from the high-illuminance region, compared with the headlamp of Patent Literature 3 in which a large part of the bottom (high-illuminance region) of the reflection mirror does not exist.

As an example of the high-illuminance region, an explanation was made above as to a region in the vicinity of the bottom of a reflection mirror. However, there may be a case where a region other than the region in the vicinity of the bottom of the reflection mirror is a region including a position at which luminous flux from the light emitting body is incident with the highest density depending on the shape of the reflection mirror and the positional relationship between the reflection mirror and the light emitting body.

That is, the high-illuminance region is not limited to a region in the vicinity of the bottom of the reflection mirror, and may be a region including a position (in the vicinity of a position) where fluorescence from the light emitting body is incident with the highest illuminance.

With the arrangement, it is possible to fully use reflection at the high-illuminance region where efficiency in extracting fluorescence is highest, so that it is possible to subdue decrease in efficiency in extracting illumination light from a region including a position where luminous flux from the light emitting body is incident with the highest density.

Advantageous Effects of Invention

As described above, the light emitting device of the present invention is designed such that the light reflecting concave surface of the reflection mirror has a through-hole at a region other than a high-illuminance region in the vicinity of a position where fluorescence from the light emitting body is incident with highest illuminance, and a light guiding member is inserted into the through-hole in order to guide the excitation light from the excitation light source to the light emitting body.

This yields an effect of subduing decrease in efficiency in extracting illumination light from a region including a position where luminous flux from the light emitting body is incident with the highest density.

For a fuller understanding of the nature and advantages of the invention, reference should be made to the ensuing detailed description taken in conjunction with the accompanying drawings.

DESCRIPTION OF EMBODIMENTS

Figure 1:
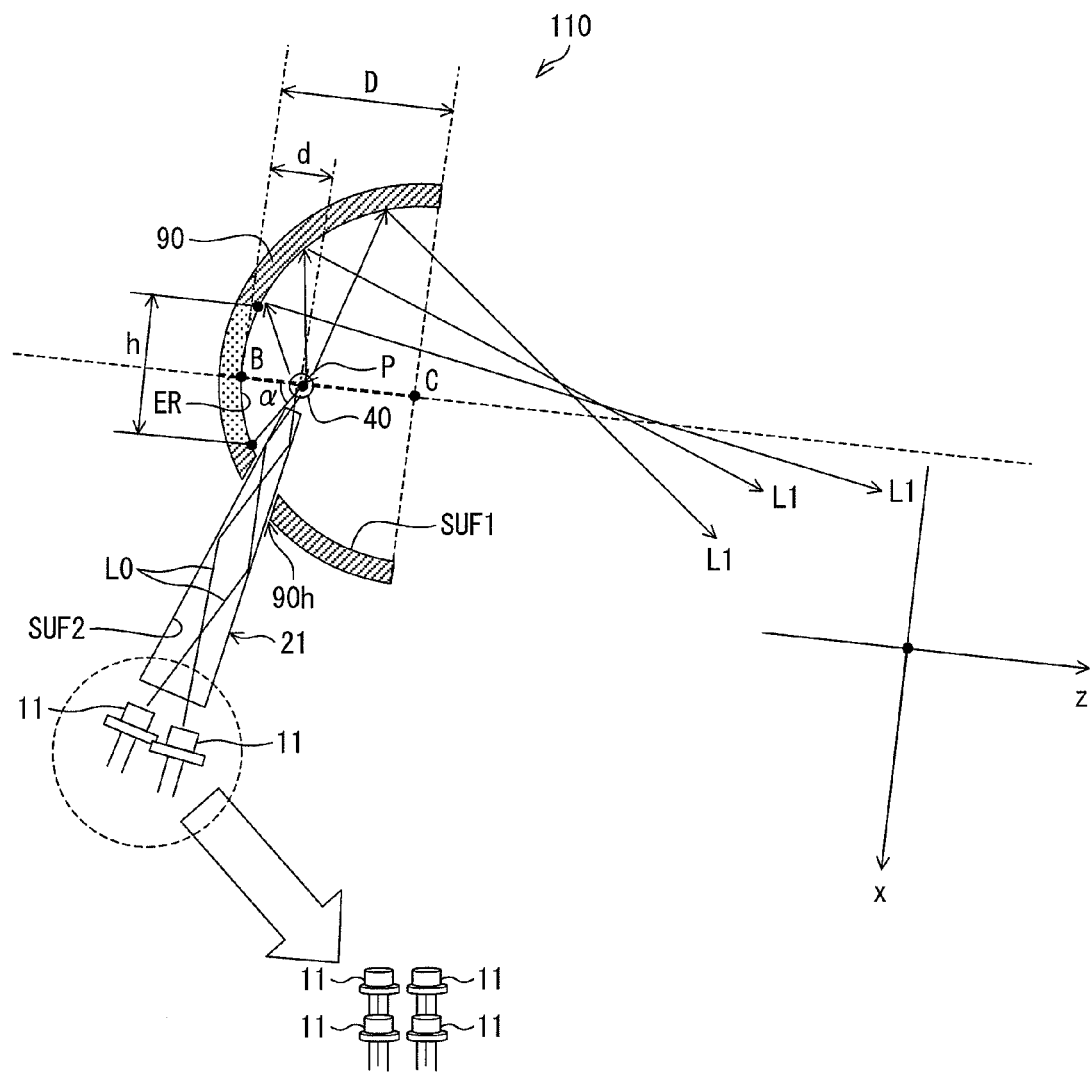
FIG. 1 is a cross sectional view schematically showing a configuration of a headlamp in accordance with one embodiment of the present invention, taken along a vertical direction.

One embodiment of the present invention will be explained below with reference to FIGS. 1-6. Configurations that are not described in specific items below are at times omitted in description as necessary. Note however, that such configurations are identical to those described in other sections. For convenience, same reference numerals are provided for members having functions identical to those described in the sections, and descriptions of these members are omitted as appropriate.

In the explanation below, embodiments of a headlamp (light emitting device, illuminating device, headlamp) 110 and a headlamp (light emitting device, illuminating device, headlamp) 120 are shown as examples of a light emitting device unit (light emitting unit) for a headlamp or a projector. However, embodiments of the present invention are not limited to these embodiments and are applicable to a light emitting device unit for illuminating devices other than a headlamp and a projector.

[1. Schematic Configuration of Headlamp 110]

Figure 2:
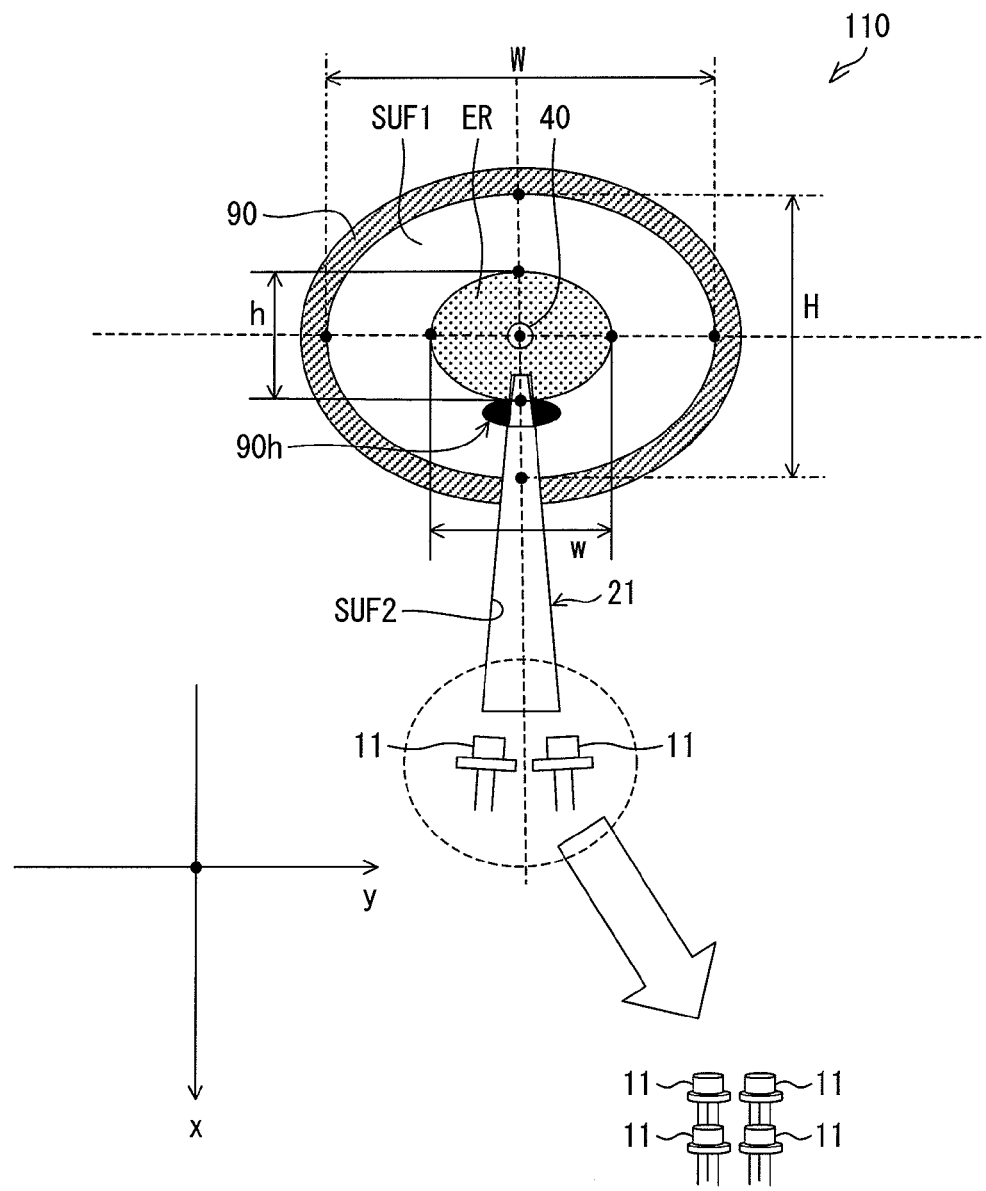
FIG. 2 is an elevation view schematically showing a configuration of the headlamp seen from the front (side of paper closer to a reader is regarded as "front").

Initially, with reference to FIGS. 1 and 2, the following explains a schematic configuration of the headlamp 110 in accordance with one embodiment of the present invention. FIG. 1 is a cross sectional view schematically showing a configuration of the headlamp 110 taken along a line in a vertical direction (x-z plane).

FIG. 2 is an elevation view schematically showing a configuration of the headlamp 110 viewed from the front (side of paper closer to a reader is regarded as "front").

As illustrated in FIGS. 1 and 2, the headlamp 110 includes four LD chips (excitation light sources) 11, a truncated pyramid light converging section (light guiding member) 21, a light emitting body 40 and a mirror (reflection mirror) 90. The headlamp 110 emits illumination light (fluorescence) L1 to the outside of the mirror 90.

(LD Chip 11)

The LD chip 11 is a semiconductor laser of a single stripe per chip. The LD chip 11 is obtained by mounting, in a $\Phi 5.6$ mm package, a GaN-based semiconductor laser chip of 405 nm in oscillation wavelength and 1.5 W (Watt) in light output.

In the present embodiment, there are provided four LD chips 11 as described above, which are positioned in a matrix manner with two chips in a longitudinal direction and two chips in a lateral direction, as indicated by outline arrows in FIGS. 1 and 2.

The oscillation wavelength of the LD chip 11 should be in a blue-violet range or a blue range (i.e., 340 nm or more and 490 nm or less).

Although the state of the art cannot provide good short-wavelength laser of 340 nm or less in wavelength, an LD chip capable of oscillating in 340 nm or less as a result of a future technical progress may be used as a light source.

With the configuration, the total of light outputs of the four LD chips 11 is a light output from a light source, so that the light output from the light source can be, by a simple calculation, approximately four times larger than the light output in a case of using a single LD chip 11. It should be noted that the four LD chips 11 have the same performance.

In the present embodiment, the number of the LD chips 11 is four. However, the number of the LD chips 11 is not limited to four and may be one to three or may be five or more.

The excitation light source may be a semiconductor laser chip of one stripe per one chip having one light emitting point, such as the LD chip 11 in accordance with the present embodiment. Alternatively, the excitation light source may be a semiconductor laser chip of plural stripes per one chip having plural light emitting points.

The excitation light source may be a one that emits coherent excitation light L0 (laser light), such as the LD chip 11 in accordance with the present embodiment, or may be a one that emits incoherent excitation light L0 (EL light; Electroluminescence light), such as the LED chip (excitation light source) 130 which will be mentioned later.

In the case of using a plurality of excitation light sources, the plurality of light sources may include LDs only or LEDs only, or may include both LDs and LEDs.

(Truncated Pyramid Light Converging Section 21)

The truncated pyramid light converging section 21 guides the excitation light L0 incident via one end thereof (end closer to the LD chip 11) to the other end thereof (end closer to the light emitting body 40) so that the excitation light L0 is emitted to the light emitting body 40.

In the present embodiment, the truncated pyramid light converging section 21 has a so-called truncated quadrangular pyramid shape. One end of the truncated pyramid light converging section 21 has a 2 mm×2 mm rectangular cross section, and the other end has a 15 mm×15 mm rectangular cross section, and the distance between one end and the other end (height of the truncated quadrangular pyramid) is 25 mm. The shape of the light guiding member is not limited to this, and may be various shapes other than the truncated quadrangular pyramid, such as a truncated polygonal pyramid, a truncated cone, and truncated elliptical cone.

The truncated pyramid light converging section 21 is made of BK (borosilicate crown) 7, and its refractive index is 1.52. It is desirable that the truncated pyramid light converging section 21 is made of a material whose refractive index is larger than 1. When the truncated pyramid light converging section 21 is made of such a material, light which is incident with a certain angle or more to an interface SUF 2 between the truncated pyramid light converging section 21 and air (refractive index=1) is totally reflected by the interface between materials with different refractive indices, without providing the interface SUF 2 with a reflecting plane etc. for reflecting the excitation light L0. Accordingly, properly selecting the material for the truncated pyramid light converging section 21 allows guiding the excitation light L0 in the truncated pyramid light converging section 21, making production of the truncated pyramid light converging section 21 easy.

Further, it is desirable to design the truncated pyramid light converging section 21 such that the other end thereof has a smaller cross sectional area than one end thereof.

With the arrangement, even if there are provided a plurality of LD chips 11 as in the present embodiment for example, it is possible to converge individual excitation lights L0 from the plurality of LD chips 11 to the other end of the truncated pyramid light converging section 21 which end has a smaller cross sectional area than one end thereof.

Hence, reduction of both the cross sectional area of the other end of the truncated pyramid light converging section 21 and the size of the light emitting body 40 allows reducing the size of the light emitting device unit which emits light having a high luminance and high luminous flux in accordance with the number of the LD chips 11.

The excitation light L0 emitted from the LD chip 11 is coherent light, and thus is narrow-beamed. Accordingly, the headlamp 110 can converge and use the laser light L0 without waste. This allows formation of an extremely small light emitting body 40, which as a result allows achievement of a headlamp 110 of a small size and with extremely high luminance. Hence, various merits are attained by applying the headlamp 110 using such LD chip 11 as the excitation light source to a vehicle headlamp, such as allowing reduction in size of a headlamp used for vehicles and the like.

(Light Emitting Body 40)

The light emitting body 40 emits illumination light (fluorescence) L1 upon receiving the excitation light L0, and includes a fluorescent material which is caused to emit light upon receiving the excitation light L0. More specifically, the light emitting body 40 is a member in which fluorescent material is dispersed inside inorganic glass with low-melting point (n=1.760) that serves as a sealing member.

In the present embodiment, an explanation is made as to a case where the light emitting body 40 is fixed by a transparent fixing member (not shown) provided at the other end of the truncated pyramid light converging section 21. However, the light emitting body 40 is not necessarily fixed by such a transparent fixing member. For example, the light emitting body 40 may be directly attached to the other end of the truncated pyramid light converging section 21.

A ratio of the inorganic glass to the fluorescent material in the light emitting body 40 is, for example, approximately 10:1. However, the ratio is not limited to this. The light emitting body 40 may be made up by pressing the fluorescent material together into a solid.

The sealing member is not limited to the inorganic glass in the present embodiment, and may be so-called organic-inorganic hybrid glass or resin materials such as silicone resin.

In the present embodiment, the fluorescent material is made by mixing Caα-SiAlON: Ce (wavelength peak of emitted light: 510 nm) and CaAlSiN$_3$ (CASN): Eu (wavelength peak of emitted light: 650 nm) in a ratio of approximately 3:1. However, the fluorescent material is not limited to this. The fluorescent material may be made up of plural types of fluorescent material as in the present embodiment, or may be made up of just a single type of fluorescent material.

Caα-SiAlON: Ce fluorescent material that emits blue-green fluorescence, which is employed in the headlamp 110 in accordance with the present embodiment, has a very broad emission range (full width half maximum: 108 nm), and when used as an illumination light source, yields a very high effect of enhancing color rendering properties of the illumination light. Further, CASN: Eu fluorescent material that emits red fluorescence has a broad emission range (full width half maximum: 90 nm) and has a high emission efficiency. Accordingly, the headlamp 110 in accordance with the present embodiment can realize a light source that emits illumination light with very good color rendering properties by mixing these fluorescent materials.

α-SiAlON (sialon) above is a so-called sialon fluorescent material (oxynitride fluorescent material), and can be classified by its crystal structure into an α-type and a β-type, as with silicon nitride. In particular, an α-sialon has a unit structure which (i) is made up of 28 atoms indicated by a general formula of: $Si_{12-(m+n)}Al_{(m+n)}O_nN_{16-n}$ (m+n<12, 0<m, n<11; each of m and n is an integer) and (ii) has two gaps where various metals can be put so that the α-sialon becomes an interstitial solid solution. It is possible to obtain a fluorescent material by employing a rare-earth element as the various metals. In a case where calcium (Ca) and europium (Eu) are employed as the various metals, it is possible to obtain a high-quality fluorescent material which emits light having a wavelength falling within a range between yellow and orange, which wavelength is longer than that of the YAG:Ce.

YAG:Ce is an yttrium (Y)-aluminum (Al)-garnet (YAG) fluorescent material activated by cerium (Ce).

The sialon fluorescent material can be excited by light whose wavelength falls within a blue-violet range or a blue range (i.e., 380 nm or more but 490 nm or less), and therefore the sialon fluorescent material is suitably used as fluorescent material for a white LED etc.

Other preferable examples of the fluorescent material include oxynitride fluorescent materials such as β-SiAlON, SCASN, and III-V compound semiconductor nanoparticle fluorescent materials. Alternatively, the fluorescent material may be the aforementioned YAG: Ce fluorescent material etc.

One of features of the semiconductor nanoparticle fluorescent material including the III-V compound semiconductor nanoparticle fluorescent material is that even in a case where just a single type of compound semiconductor (e.g., indium phosphide: InP) is used, it is possible to change its luminous color by quantum size effect, by changing its particle diameter in the order of nanometers. For instance, InP emits red light when the particle size is around 3 nm to 4 nm. In the embodiment, the particle size is evaluated with a transmission electron microscope (TEM).

Moreover, since the fluorescent material is semiconductor-based, the fluorescence duration is short. However, power of the excitation light L0 can be emitted rapidly as fluorescence, so therefore the fluorescent material is highly resistant against high power excitation light L0. This is because the light emission duration of the semiconductor nanoparticle fluorescent material is around 10 nanoseconds, which duration is five digits smaller than that of regular fluorescent material which has the rare earths serve as a luminescence center.

Since the light emission duration is short, it is possible to rapidly repeat absorption of the excitation light L0 and light emission from the fluorescent material. As a result, high efficiency is maintained with respect to strong laser light, and generation of heat from the fluorescent material is held down.

This allows further preventing the light emitting body 40 from deteriorating (discoloring or deformation) caused by heat. Accordingly, in a case where a light emitting element having high optical output is used as a light source, it is possible to prevent the life of the headlamp 110 in accordance with the present embodiment or the later-mentioned headlamp 120 from shortening.

It is considered that the light emitting body 40 deteriorates due to deterioration in a sealing member (e.g. silicone resin) of the fluorescent material in the light emitting body 40. The sialon fluorescent material emits light with an efficiency of 60% to 80% upon irradiation with the laser light, however the remainder just serves as a cause for generation and discharging of heat. It is considered that this heat deteriorates the sealing member.

Accordingly, a sealing member having high thermal resistance is preferable. Examples of the sealing member having high thermal resistance include glass.

It is known that white light can be made up by a mixture of three colors which meet an isochromatic principle or by a mixture of two colors which are complementary colors for each other. The white light can be obtained by appropriately selecting a color of the excitation light L0 emitted from the LD chip 11 and a color of the illumination light L1 emitted by the fluorescent material, based on the isochromatic or complementary color principle.

For example, one method for causing the headlamp 110 to emit illumination light L1 of a white color is a method in which laser light whose oscillation wavelength falls within a blue-violet range (i.e., 380 nm or more and less than 420 nm) is employed as excitation light, and a combination of blue fluorescent material, green fluorescent material, and red fluorescent material is employed as the fluorescent material.

Another method is a method in which laser light whose oscillation wavelength falls within a blue range (i.e., 440 nm or more and 490 nm or less) is employed as the excitation light L0, and yellow fluorescent material or a combination of green fluorescent material with red fluorescent material is employed as the fluorescent material.

Furthermore, LED light whose oscillation wavelength falls within a blue range (i.e., 440 nm or more and 490 nm or less) may be employed as the excitation light L0, and yellow fluorescent material or a combination of green fluorescent material with red fluorescent material may be employed as the fluorescent material.

The yellow fluorescent material is fluorescent material which emits light in a wavelength range of not less than 560 nm and not more than 590 nm. The green fluorescent material is fluorescent material which emits light in a wavelength range of not less than 510 nm and not more than 560 nm. The red fluorescent material is fluorescent material which emits light in a wavelength range of not less than 600 nm and not more than 680 nm.

(Mirror 90)

The mirror 90 forms a pencil of rays (illumination light L1) which travels within a predetermined solid angle. The mirror 90 may be, for example, a member having a metal thin film thereon or may be a metal member.

In the present embodiment, the shape of an opening of the mirror 90 (light reflecting concave surface SUF 1) (which opening is positioned at the right side of FIG. 1 and the front side of FIG. 2) is an ellipse whose long axis has a length W of 30 mm and whose short axis has a length H of 25 mm. However, the shape of the opening of the mirror 90 is not limited to this, and may be a circle, a convex polygon etc.

Further, as illustrated in FIGS. 1 and 2, the headlamp 110 is designed such that in a normal use condition, the optical axis of the mirror 90 is along the y-z plane (substantially horizontal plane), the long axis of the elliptic opening is along the y-axis direction (substantially horizontal direction), and the short axis of the elliptic opening is along the x-direction (substantially vertical direction).

Here, light intensity required of a headlamp is approximately 10,000 to 100,000 candela. On the other hand, luminance of the LD chip 11 is approximately 10 to 100 candela/mm$^2$. Accordingly, in a case where the reflectance of the mirror 90 is 100%, the area of the mirror 90 seen from the opening is required to be approximately 100 to 10,000 mm$^2$, and may have any shape. Since the reflectance of the mirror 90 in reality is limited (e.g. 60 to 80%), the area of the mirror 90 seen from the opening is a little larger than approximately 100 to 10,000 mm$^2$, which is not related to the shape of the opening.

As described above, the area of the mirror 90 seen from the opening is approximately 100 to 10,000 mm$^2$. In this case, when the area of a through-hole 90$h$ is approximately 7 mm×7 mm=49 mm$^2$, there is a great loss in reflection efficiency if the mirror 90 is designed to be small in particular. Accordingly, as the mirror 90 is smaller in size, the effect mentioned below of the headlamp 110 becomes remarkable.

On the other hand, an important region in the mirror 90 is a region close to the light emitting body 40 (i.e. bottom region (high-illuminance region) ER). The bottom region ER is irradiated with fluorescence emitted from the light emitting body 40 with high density. Therefore, if reflection of a part of the mirror 90 which part is irradiated with fluorescence with such density (i.e. bottom region ER), efficiency in extracting the illumination light L1 in the whole of the headlamp 11 would decrease.

In view of the above, even if the mirror 90 is large in size, it is possible to obtain the effect of the headlamp 110 which will be explained below.

The depth D of the mirror 90 (width of the mirror 90 in a lateral direction of FIG. 1) is 40 mm. The depth D is a distance between an opening center C of the opening of the mirror 90 and a position B of the light reflecting concave surface SUF 1. The mirror 90 has a so-called parabola shape such that cross sections obtained by cutting the light reflecting concave surface SUF 1 by planes vertical to the long axis and the short axis, respectively, are parabolic and the long axis is along a horizontal direction (y-axis direction in FIG. 2).

Consequently, in a normal use condition, a light spot of fluorescence (illumination light L0) which is formed on an illumination target area (including a direct front of the headlamp 110) is designed to be narrow in the short axis direction and long in the long axis direction. This allows satisfying light distribution properties required of a vehicle headlamp (see (a) of FIG. 4) for example.

The mirror 90 may partially include a non-parabolic region. The mirror 90 may be a parabola mirror including a closed-circle opening or a part of the closed-circle opening. The mirror 90 is not limited to a parabola mirror in shape, and may be a semi-spheroidal mirror or a semi-spherical mirror. That is, the mirror 90 should be designed such that the reflecting surface at least partially includes a curved surface obtained by rotating a figure (ellipse, circle, and parabola) around a rotation axis. The mirror 90 does not necessarily have a curved surface and may have a polygonal shape obtained by combining a plurality of plane mirrors. However, since the mirror 90 is preferably shaped to have at least one light converging point, the mirror 90 in accordance with the present embodiment has a parabola shape.

The light emitting body 4 is provided at a position P which is away by a distance d (=10 mm) from the position B of the mirror 90.

Further, the through-hole 90h is provided at a region outside the bottom region ER of the light reflecting concave surface SUF 1 of the mirror 90. The other end of the truncated pyramid light converging section 21 is inserted into the through-hole 90h toward the position P where the light emitting body 40 exists. In the headlamp 110 in a normal use condition, the through-hole 90h is provided at the lower part of the light reflecting concave surface SUF 1 of the mirror 90 in a vertical direction (x-axis direction). The bottom region ER is a region in the vicinity of the bottom of the light reflecting concave surface SUF 1.

In the present embodiment, as illustrated in FIG. 2, when seen from the front of the mirror 90, the bottom region ER has an elliptic shape whose long axis has a length w of approximately 4.38 mm and whose short axis has a length h of approximately 3.13 mm. As illustrated in FIG. 1, the bottom region ER has a depth, which is d/2=approximately 5 mm.

In a normal use of the device, when emitting the illumination light L1 in a front direction of the device (z-axis direction of FIG. 1), making as good as possible use of reflection in the vicinity of the bottom of the mirror 90 (bottom region ER) increases efficiency in extracting fluorescence. For example, assume that a structure of the light source device of Patent Literature 1 or the lamp of Patent Literature 2 in which a through-hole is provided in the vicinity of the bottom of a reflection mirror is designed to have a light guiding member inserted into the through-hole. Such a structure could not sufficiently use reflection at the bottom region of the reflection mirror where efficiency in extracting fluorescence (illumination light) is high.

In order to deal with this problem, the headlamp 110 is designed to have the through-hole 90h at a region outside the bottom region ER of the light reflecting concave surface SUF 1 of the mirror 90.

Further, needless to say, the headlamp 110 can subdue reduction in efficiency in extracting illumination light from a region in the vicinity of the bottom of the reflection mirror, compared with the headlamp of Patent Literature 3 in which a large part of the bottom of the reflection mirror does not exist.

Consequently, with the arrangement, it is possible to subdue reduction in the efficiency in extracting illumination light from a region in the vicinity of the bottom of the reflection mirror.

In the present embodiment, the other end of the truncated pyramid light converging section 21 is inserted into the through-hole 90h provided in the mirror 90 toward the light emitting body 40. That is, an angle θ formed by an x-axis direction and a t-axis direction (see FIG. 5), which will be mentioned later, is approximately 0°.

Figure 4:
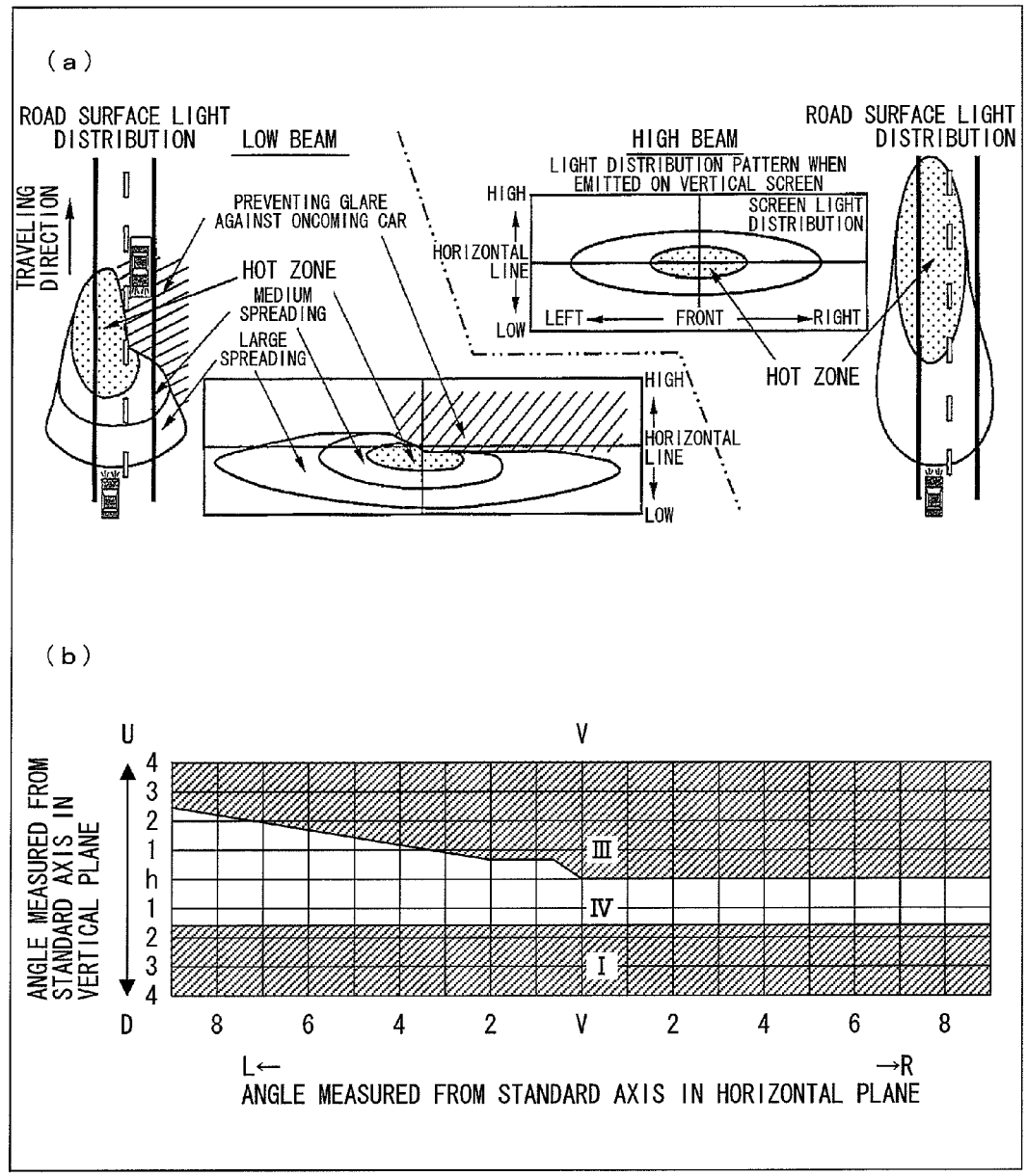
FIG. 4 is a view showing a light distribution pattern or light distribution characteristics required of a vehicle headlamp (low beam/high beam). (a) of FIG. 4 shows a distribution pattern required of a vehicle headlamp (low beam/high beam). (b) of FIG. 4 shows light distribution characteristics required of a low beam.

In a case where the headlamp 110 is used as a headlamp or a projector, it is unnecessary to project light (fluorescence) upwardly (see (a) of FIG. 4) or downwardly by a certain angle or more from a horizontal line on the screen. For this reason, in the above arrangement, the through-hole 90h is provided at a region of the light reflecting concave surface SUF 1 which region would reflect light toward a non-illumination target area on the screen (region other than the bottom region ER), and the truncated pyramid light converging section 21 is inserted into the through-hole 90h. That is, when the truncated pyramid light converging section 21 is inserted into the through-hole 90h in a direction extending along a vertical direction (x-axis direction), it is possible to achieve a headlamp or a projector which illuminates an illumination target region (including the direct front of the device) with high brightness and visibility and which has high efficiency in extracting illumination light.

For example, as illustrated in FIGS. 1 and 2, in a case where the truncated pyramid light converging section 21 is inserted into the through-hole 90h toward the light emitting body 40 upwardly in a vertical direction, it is possible to achieve a headlamp of an automobile, a train, or a ship which is used in visually observing an obstacle on a ground, sea, or water and which emits, in a substantially horizontal direction and a little downwardly in a vertical direction, illumination light with high brightness and visibility onto an illumination target area (including the direct front of the device).

Further, contrary to FIGS. 1 and 2, the present invention may be arranged such that the through-hole 90h is provided at the upper part of the light emitting concave surface SUF 1 in a vertical direction and the truncated pyramid light converging section 21 is inserted into the through-hole 90h toward the light emitting body 40 downwardly in a vertical direction (not shown). In this case, it is possible to achieve a projector which projects, in a substantially horizontal direction and a little upwardly in a vertical direction, illumination light with high brightness and visibility toward an illumination target area (including the direct front of the device).

"A direction in which the light guiding member is inserted extends along a vertical direction" indicates not only a case where the direction in which the light guiding member is inserted and the vertical direction are completely equal to each other but also a case where the two directions are a little different from each other. Specific examples include a case where the direction in which the light guiding member is inserted is different from (is not in line with) the vertical direction on the x-z plane in FIG. 1, a case where the direction in which the light guiding member is inserted is different from (is not in line with) the vertical direction on the x-y plane in FIG. 2, and the combination of these two cases.

As described above, when emitting illumination light L1 to the front of the headlamp 110 (to a side closer to a reader in FIG. 2), reducing as small as possible reflection at a region in the vicinity of the deepest region of the mirror 90 (bottom region ER) results in increase in efficiency in extracting fluorescence. For example, assume that a structure in which the through-hole 90h (not a small hole) is provided in the bottom region ER of the mirror 90, such as the light source device of Patent Literature 1, is designed to have the truncated pyramid light converging section 21 inserted into the through-hole 90h in order to excite the light emitting body 40. Such a structure could not fully use reflection at the bottom region ER of the mirror 90. Further, in a case where the headlamp 110 is used as a headlamp or a projector, it is unnecessary to project light (fluorescence) upwardly or downwardly by a certain angle or more from a horizontal line on the screen in (a) of FIG. 4. For this reason, in the headlamp 110 in accordance with the present embodiment, the through-hole 90h is provided at a region which would reflect fluorescence emitted from the light emitting body 40 toward a non-illumination target area on the screen (region other than the bottom region ER), and the truncated pyramid light converging section 21 is inserted into the through-hole 90h. Thus, it is possible to achieve a headlamp or a projector which illuminates an illumination target area in front of the headlamp 110 with high brightness and visibility without casting a shadow of the truncated pyramid light converting section 21 and which has high efficiency in extracting illumination light L1.

If the through-hole 90h were provided at the bottom of the light reflecting concave surface SUF 1 and the truncated pyramid light converging section 21 were inserted into the through-hole 90h, there would be a possibility that the truncated pyramid light converging section 21 cast a shadow on an illumination target area (including the direct front of the device). However, by designing the mirror 90 such that the through-hole 90h is provided at a region other than the bottom region ER of the light reflecting concave surface SUF 1 and the truncated pyramid light converging section 21 is inserted into the through-hole 90h downwardly or upwardly in a vertical direction, it is possible to prevent the truncated pyramid light converging section 21 from casting a shadow on the illumination target area (including the direct front of the device).

(Size of Bottom Region ER)

In the present embodiment, a ratio of the area of the bottom region ER to the whole area of the light reflecting concave surface SUF 1 of the mirror 90 is approximately $(d/D \times 1/2)^2 = (1/8)^2 = 1/64$.

The ratio of the area of the bottom region ER to the whole area of the light reflecting concave surface SUF 1 of the mirror 90 is preferably not less than 1/81 and not more than 1/4.

When the area ratio is less than 1/81, the area of the bottom region ER is too small, resulting in decrease in efficiency in extracting the illumination light L1 from a region in the vicinity of the bottom of the mirror 90.

On the other hand, when the area ratio is more than 1/4, the distance between the position B of the light reflecting concave surface SUF 1 and the light emitting body 40 (position P) increases accordingly, resulting in decrease in efficiency in extracting the illumination light L1 by the mirror 90.

In another aspect, it is preferable that when the position B of the light reflecting concave surface SUF 1 is seen from the position P where the light emitting body 40 is provided, the bottom region ER is positioned in a solid angle whose deviation angle α with respect to the optical axis is not less than 20° and not more than 80°. In the headlamp 110 illustrated in FIG. 1, the deviation angle α is approximately 45°.

When the deviation angle α is less than 20°, the area of the bottom region ER is too small, resulting in decrease in efficiency in extracting the illumination light L1 by the mirror 90.

On the other hand, when the deviation angle α is more than 80°, it is difficult to insert the truncated pyramid light converging section 21 into the through-hole 90h in such a manner that the truncated pyramid light converging section 21 does not cast a shadow on an illumination target area (including the direct front of the device).

[2. Characteristic Configuration of the Present Invention]

Figure 6:
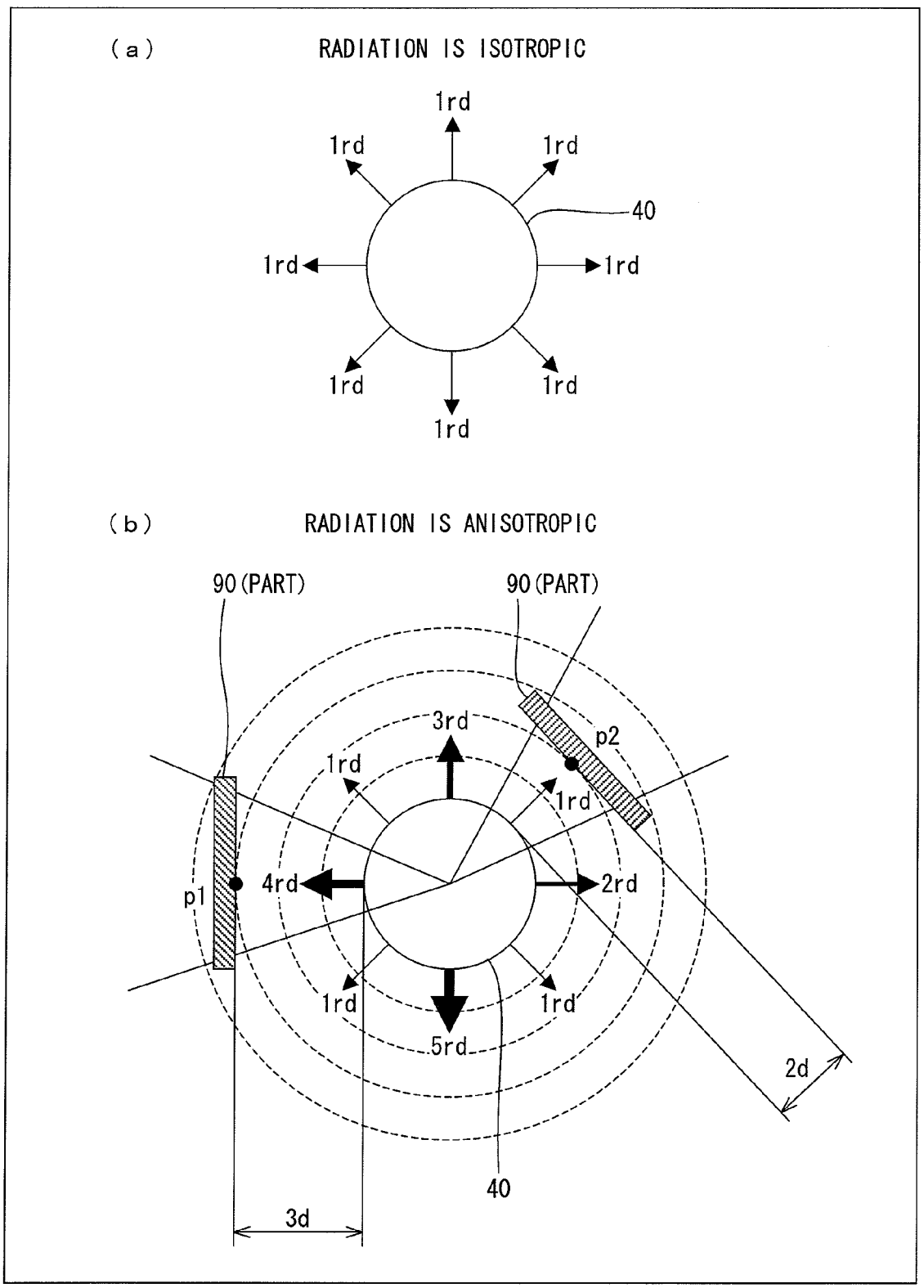
FIG. 6 is a view for explaining a high-illuminance region where fluorescence from a light emitting body is incident with high illuminance. (a) of FIG. 6 shows the high-illuminance region in a case where radiation density of fluorescence from the light emitting body is isotropic. (b) of FIG. 6 shows the high-illuminance region in a case where the radiation density is anisotropic.

With reference to FIG. 6, the following explains a characteristic configuration of the present invention in more detail.

It is considered that making as good as possible use of reflection at a region of the mirror 90 (high-illuminance region) at which region luminous flux from the light emitting body 40 is incident with higher density (i.e. higher illuminance) than other region increases efficiency in extracting fluorescence in the headlamp 110 (or headlamp 120).

A typical example of such a high-illuminance region is the bottom region ER mentioned above.

However, there may be a case where a region other than the region in the vicinity of the bottom of the mirror 90 includes a position at which luminous flux from the light emitting body 40 is incident with the highest density, depending on the shape of the mirror 90 and the positional relationship between the mirror 90 and the light emitting body 40.

That is, the high-illuminance region is not limited to the bottom region ER, and may be a region of the light reflecting concave surface of the mirror 90 which region includes a position (which region is in the vicinity of a position) where fluorescence from the light emitting body 40 is incident with the highest illuminance.

Accordingly, the headlamp 110 (or the headlamp 120) may be designed such that the through-hole 90h is provided at a region other than a high-illuminance region in the vicinity of a position where fluorescence from the light emitting body 40 is incident with the highest illuminance.

With the arrangement, it is possible to fully use reflection at the high-illuminance region where efficiency in extracting fluorescence (illumination light) is high, so that it is possible to subdue decrease in efficiency in extracting illumination light from a region including a position where luminous flux from the light emitting body 40 is incident with the highest density (i.e. high-illuminance region).

It is considered that such a high-illuminance region is qualitatively a region including a position where a ratio of radiation density of fluorescence from the light emitting body 40 to the distance between the light reflecting concave surface SUF 1 and the light emitting body 40 is highest. This will be explained below.

Strictly speaking, "radiation density" measured while a light receiving surface of an optical sensor is positioned vertically to a fluorescent ray is proportional to a value obtained by dividing an output value of the optical sensor by the area of the light receiving surface. When the light receiving surface is sufficiently small, "radiation density" may be considered as being substantially proportional to the output value of the optical sensor.

That is, "radiation density" may be replaced with the output value of the optical sensor (intensity of fluorescence at a position where the fluorescence is measured).

For example, in a case where radiation density of fluorescence from the light emitting body 40 is isotropic (radiation density is constant, i.e. radiation density is always "1rd" where "rd" is a constant) as illustrated in (a) of FIG. 6, a position at which the distance between the light reflecting concave surface SUF 1 and the light emitting body 40 is shortest is a position where fluorescence from the light emitting body 40 is incident with the highest illuminance.

For example, in a case where the light reflecting concave surface SUF 1 is parabolic and the light emitting body 40 is provided at the position P in the vicinity of the focus of the parabola, the position where fluorescence from the light emitting body 40 is incident with the highest illuminance is a position where the distance between the light reflecting concave surface SUF 1 and the light emitting body 40 is shortest, i.e. the position B illustrated in FIG. 1. Accordingly, the bottom region ER is a typical example of the high-illuminance region mentioned above.

Next, with reference to (b) of FIG. 6, an explanation is made as to a case where radiation density of fluorescence from the light emitting body 40 is anisotropic.

In the example illustrated in (b) of FIG. 6, "1rd", "2rd", "3rd", "4rd", and "5rd" indicate that radiation density of fluorescence from the light emitting body 40 is higher in this order.

Here, the distance between a position p1 at a part of the mirror 90 and the light emitting body 40 is 3d where "d" is a constant. 3d is 1.5 times larger than the distance 2d between a position p2 and the light emitting body 40.

However, radiation density at the position p1 (4rd) is 4 times larger than radiation density of the position p2 (1rd).

Consequently, in this case, although the position p1 is farther from the light emitting body 40 than the position p2 is, illuminance at the position p1 is higher than illuminance at the position p2.

It is considered that in a case where radiation density of fluorescence from the light emitting body 40 is constant, illuminance of the fluorescence from the light emitting body 40 is larger as the distance from the light emitting body 40 is shorter.

On the other hand, it is considered that in a case where the distance from the light emitting body 40 is constant, illuminance of the fluorescence from the light emitting body 40 is higher as radiation density of the fluorescence from the light emitting body 40 is larger.

In view of the above, the position where the fluorescence from the light emitting body 40 is incident with the highest illuminance is qualitatively a position where a product of radiation density of the fluorescence from the light emitting body 40 and an inverse ratio of the distance between the light reflecting concave surface SUF 1 and the light emitting body 40 is largest.

That is, a characteristic configuration of the present invention is such that on the light reflecting concave surface SUF 1 of the mirror 90, the through-hole 90h is provided at a region other than a high-illuminance region including a position where a ratio of radiation density of the fluorescence from the light emitting body 40 to the distance between the light reflecting concave surface SUF 1 and the light emitting body 40 is highest.

Patent Literature 1 mentioned above discloses a light source device including an LD, a collimator for causing laser light to be a flux of parallel rays, a condenser for converging the flux of parallel rays, and a fluorescent material. Patent Literature 2 mentioned above discloses a lamp including a semiconductor light emitting element, a fluorescent material positioned distantly from the semiconductor light emitting element, a first optical member for converging light from the semiconductor light emitting element toward the fluorescent material, and a second optical member for radiating the light from the fluorescent material toward the outside.

Patent Literature 3 mentioned above discloses a light source including a fluorescent material and a light radiating section for radiating light in a plurality of different directions.

It should be noted that Patent Literatures 1-3 do not mention at all the characteristic configuration of the present invention, the effect yielded by the characteristic configuration, and the object to be solved by the present invention.

[3. Schematic Configuration of Excitation Light Source]

Figure 3:
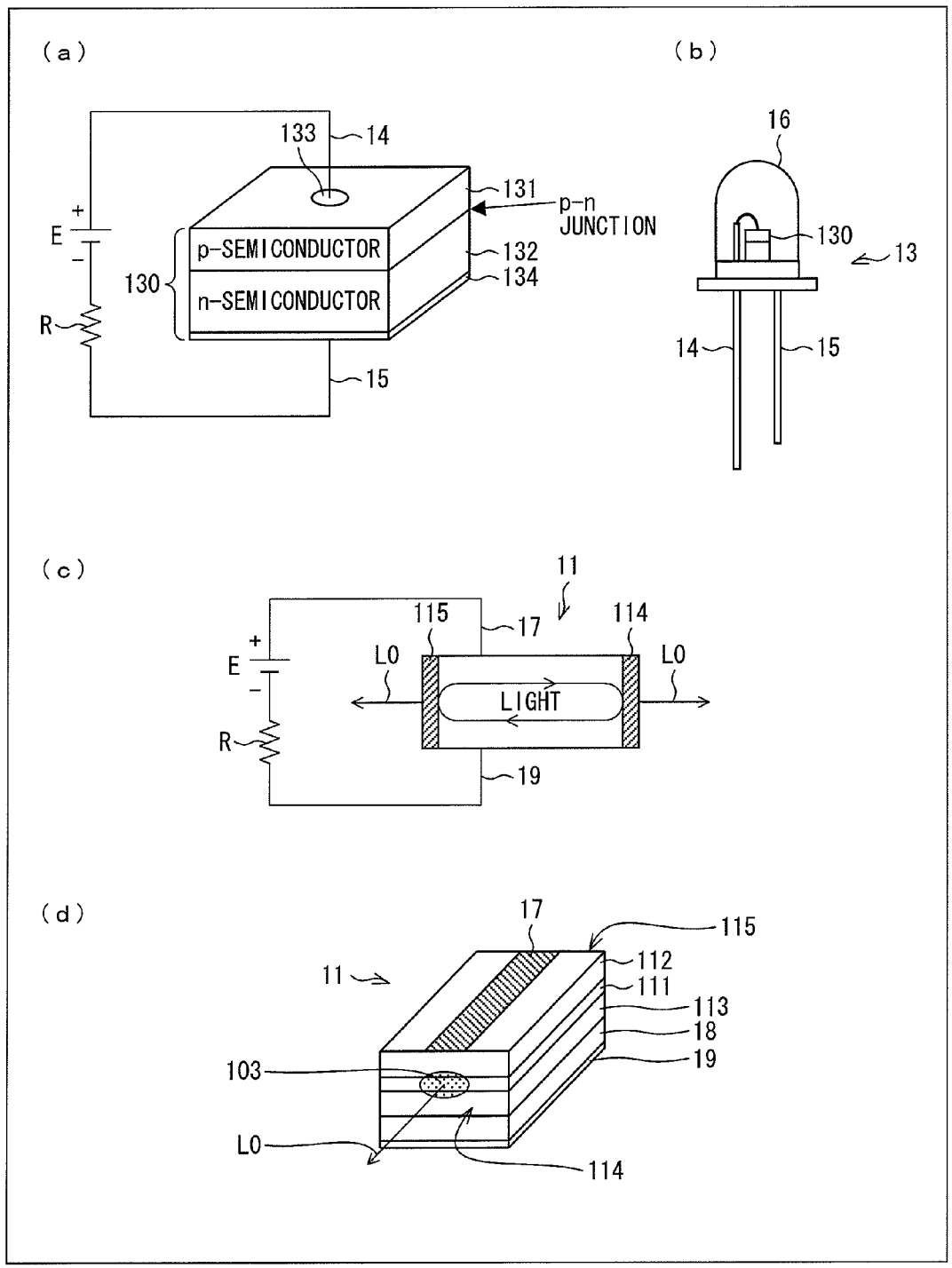
FIG. 3 is a view showing a specific example of an excitation light source of the headlamp. (a) of FIG. 3 shows a circuit of one example of the excitation light source (LED). (b) of FIG. 3 shows an appearance of the LED seen from the front. (c) of FIG. 3 shows a circuit of another example of the excitation light source (LD). (d) of FIG. 3 shows an appearance of the LD seen from a right skew direction.

The following description explains a specific example of an excitation light source, with reference to (a) to (d) of FIG. 3.

Illustrated in (a) of FIG. 3 is a circuit of a LED lamp (excitation light source) 13, as an example of the excitation light source, and (b) of FIG. 3 illustrates a front outlook of the LED lamp 13. Illustrated in (c) of FIG. 3 is a circuit of a LD chip 11 as another example of the excitation light source, and (d) of FIG. 3 illustrates an outlook of the LD chip 11 seen from a right skew direction.

As illustrated in (b) of FIG. 3, the LED lamp 13 is configured in such a manner that an LED chip (excitation light source) 130 is sealed in an epoxy resin cap 16, which LED chip 130 is connected to an anode 14 and a cathode 15.

As illustrated in (a) of FIG. 3, the LED chip 130 has a p-n junction of a p-type semiconductor 131 and an n-type semiconductor 132. The anode 14 is connected to a p-type electrode 133 and the cathode 15 is connected to an n-type electrode 134. Note that the LD chip 11 is connected to a power source E via a resistor R.

The connection of the anode 14 and the cathode 15 with the power source E forms a circuit. This allows supplying electricity from the power source E to the LED chip 130, thereby allowing emission of incoherent excitation light from the surroundings of the p-n junction.

Materials that may be used for the LED chip 130 encompass compound semiconductors such as: GaP, AlGaAs, GaAsP, and the like whose luminous color is red; GaAsP whose luminous color is orange; GaAsP and GaP whose luminous color is yellow; GaP whose luminous color is green; and SiC and GaN whose luminous color is blue.

The LED chip 130 has features in which it is driven at a low voltage of approximately 2 V to 4 V, is small and lightweight, is quick in response speed, has a long life, and is available at low cost.

As illustrated in (c) of FIG. 3 and (d) of FIG. 3, the LD chip 11 is made up by stacking a cathode electrode 19, a substrate 18, a clad layer 113, an active layer 111, a clad layer 112, and an anode electrode 17 in this order.

The substrate 18 is a semiconductor substrate, and in order to obtain a blue to ultraviolet excitation light for exciting a fluorescent material as in the present application, it is preferable to use GaN, sapphire, or SiC as the substrate 18. Generally, other examples of a substrate for semiconductor laser encompass substrates made of material such as: IV semiconductors such as Si, Ge, and SiC; III-V compound semiconductors represented by GaAs, GaP, InP, AlAs, GaN, InN, InSb, GaSb, and AlN; II-VI compound semiconductors such as ZnTe, ZeSe, ZnS, and ZnO; oxide insulators such as ZnO, $Al_2O_3$, $SiO_2$, $TiO_2$, $CrO_2$, and $CeO_2$; and nitride insulators such as SiN.

The anode electrode 17 is provided for injecting current into the active layer 111 via the clad layer 112.

The cathode electrode 19 is provided for injecting current into the active layer 111 via the clad layer 113 from under the substrate 18. The current is injected by applying a forward bias to the anode electrode 17 and the cathode electrode 19.

The active layer 111 is sandwiched between the clad layer 113 and the clad layer 112.

In order to obtain a blue to ultraviolet excitation light, a mixed crystal semiconductor including AlInGaN is used as material of the active layer 111 and the clad layers 112 and 113. Generally, a mixed crystal semiconductor whose main component is Al, Ga, In, As, P, N, or Sb is used as an active layer and clad layers of a semiconductor laser, and the configuration may be as such. Moreover, the active layer 111 and the clad layers 112 and 113 may be made up of a II-VI compound semiconductor such as Zn, Mg, S, Se, Te, or ZnO.

The active layer 111 is a region which emits light upon the injection of the current. The light emitted is trapped within the active layer 111 due to the difference in refractive index between the clad layer 112 and the clad layer 113.

Furthermore, the active layer 111 is formed so as to have a front cleaved plane 114 and a rear cleaved plane 115 which are disposed facing each other to trap the light amplified by stimulated emission. The front cleaved plane 114 and rear cleaved plane 115 serve as mirrors.

However, different from a mirror which completely reflects light, a portion of the light amplified by the stimulated emission is emitted from the front cleaved plane 114 and the rear cleaved plane 115 (in the embodiment, referred to as front cleaved plane 114 for convenience) of the active layer 111, and this emitted light serves as the laser light L0 (laser light). Note that the active layer 111 may be of a multilayer quantum well structure.

The rear cleaved plane 115 facing the front cleaved plane 114 has a reflective film (not illustrated) provided thereon, which reflective film is used for laser emission. By providing a difference in reflectance between the front cleaved surface 114 and the rear cleaved surface 115, it is possible to have most of the laser light L0 be emitted from a low-reflectance edge plane, for example the front cleaved plane 114 via the light emitting point 103.

Film formation of the semiconductor layers such as the clad layer 113, the clad layer 112, and the active layer 111, may be carried out by a general film forming method such as MOCVD (metal-organic chemical vapor deposition), MBE (molecular beam epitaxy), CVD (chemical vapor deposition), laser ablasion, sputtering, or like method. The film formation of the metal layers may be carried out by a general film forming method such as vacuum deposition, plating, laser ablasion, sputtering or like methods.

[4. Standard for Light Distribution Characteristics]

Illustrated in (a) of FIG. 4 is a light distribution pattern required of a vehicle headlamp (low beam/high beam)

As illustrated in (a) of FIG. 4, there are two types of light distribution patterns required of the headlamp: a light distribution pattern required of a low beam, and a light distribution pattern required of a high beam.

Screen light distribution illustrated in (a) of FIG. 4 is an illuminance distribution of light radiated on a vertical screen provided to face the vehicle headlamp. The brightest part in the front direction is called a hot zone, and light intensity of this part determines a reached distance to a distant place.

Moreover, with the low beam, a remarkable difference in brightness is required between the upper half and the lower half based on a horizontal line, in order to hold down glare against an oncoming vehicle.

Illustrated in (b) of FIG. 4 is a view of the light distribution characteristics required of the low beam of the vehicle headlamp.

As illustrated in (b) of FIG. 4, cut lines which determine a brightness boundary of the light distribution pattern unique to the low beam are formed on a borderline of shaded region I and region IV, and also on a borderline of shaded region III and region IV. With the light distribution characteristics required of the low beam, a remarkable brightness difference is required between the upper and lower parts of the horizontal line.

[5. Headlamp 120]

Figure 5:
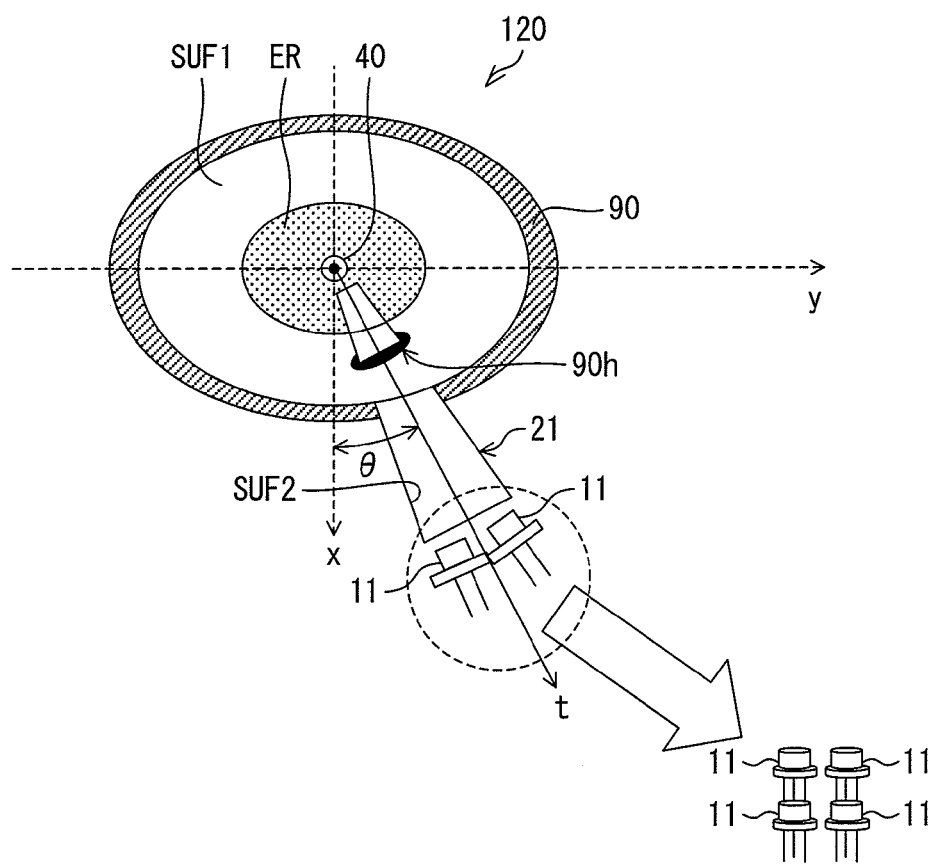
FIG. 5 is an elevation view schematically showing a headlamp in accordance with another embodiment of the present invention, which is seen from the front.

With reference to FIG. 5, the following explains a schematic configuration of the headlamp 120 in accordance with another embodiment of the present invention. FIG. 5 is an elevation view showing a schematic configuration of the headlamp 120 seen from the front.

As illustrated in FIG. 5, the headlamp 120 is the same as the headlamp 110 except for the differences mentioned below, and therefore explanations of the headlamp 120 are omitted properly.

(1) Difference in position where the through-hole 90$h$ is provided in the light reflecting concave surface SUF 1 of the mirror 90.

(2) Difference such that an angle θ formed by a direction in which the truncated pyramid light converging section 21 is inserted (t-axis direction) and a vertical direction in a normal use state (x-axis direction) is not less than 15° and not more than 30°.

(Through-Hole 90$h$)

The headlamp 110 is designed such that the through-hole 90$h$ is provided at the lower part of the light reflecting concave surface SUF 1 of the mirror 90 in a vertical direction (x-axis direction). In contrast thereto, the headlamp 120 in accordance with the present embodiment is designed such that the through-hole 90$h$ is inclined rightward on the paper of FIG. 5 (in a positive direction of y-axis) by a small angle from the lower part of the light reflecting concave surface SUF 1 in a normal use state. (Angle formed by a direction in which the truncated pyramid light converging section 21 is inserted and x-axis direction)

The following explains a preferable range of an angle θ formed by a direction in which the truncated pyramid light converging section 21 is inserted (t-axis direction) and the x-axis direction.

The angle θ is preferably not less than 15° and not more than 30°. For example, in a case of left-traffic countries such as Japan and the United Kingdom, the light distribution characteristics required of a low beam are substantially those illustrated in (b) of FIG. 4 (the drawing is based on the Japanese safety standard). That is, the headlamp 120 is required to emit light toward its front with a little amount of upward bias on the left.

Accordingly, by setting the angle θ to be not less than 15° and not more than 30° in the configuration illustrated in FIG. 5 for example, it is possible to meet conditions of two angles of a cutoff line required of a low beam (angle at direct front=30°, angle at left=15°, see (b) of FIG. 4).

In the right-traffic countries such as U.S.A., Germany, and France, the positional relationship between right and left of the configuration in FIG. 5 for example should be reversed.

The present invention may be expressed also as follows.

The headlamp (light emitting device, illuminating device) of the present invention may be arranged to be a headlamp including a light emitting body and a semiconductor laser serving as an excitation light source, the headlamp further including: a light guiding member for radiating excitation light from the semiconductor laser to the light emitting body; and a reflection mirror for converging illumination light from the light emitting body in a desired direction, the light guiding member being at least partially positioned inside the reflection mirror, and the excitation light being propagated in the light guiding member upwardly in a vertical direction including a straight line extending in the desired direction in which the illumination light from the light emitting body is converged.

Consequently, it is possible to realize a headlamp of an automobile, a train, or a ship which is for use in visually observing obstacles on ground, sea or water and which emits illumination light substantially horizontally and slightly downward in such a manner that the headlamp assures brightness and visibility without casting a shadow on an illumination target area (including the direct front of the headlamp).

When emitting the illumination light in a front direction of the headlamp, making as good as possible use of reflection in the vicinity of the deepest portion (bottom portion) of the curved mirror (reflection mirror) increases efficiency in extracting fluorescence. For example, assume that a structure of Patent Literature 1 in which a hole (through-hole) (not a small hole) is provided in the vicinity of the deepest region of a curved mirror is designed to have a light guiding member inserted into the through-hole in order to excite a light emitting member. Such a structure could not use reflection in the vicinity of the deepest region of the curved mirror. Further, in the case of a headlamp, it is unnecessary to project light (fluorescence) upwardly by a certain angle or more from a horizontal line. Accordingly, in the present invention, a hole (through-hole) is provided at a region which would reflect fluorescence from the light emitting body toward a non-illumination target area (region other than the bottom region), and a light guiding member is inserted into the through-hole. Thus, it is possible to achieve a headlamp which illuminates an illumination target area with high brightness and visibility without casting a shadow on the illumination target area and which has high efficiency in extracting fluorescence.

Light intensity required of the headlamp is approximately 10,000 to 100,000 candela. On the other hand, luminance of the light source is approximately 10 to 100 candela/mm$^2$. Accordingly, the area of the curved mirror seen from the opening is required to be approximately 100 to 10,000 mm$^2$.

Accordingly, in a case where the reflectance of the curved mirror is 100%, the area of the curved mirror seen from the opening is required to be approximately 100 to 10,000 mm$^2$, and may have any shape. Since the reflectance of the curved mirror in reality is limited (e.g. 60 to 80%), the required area of the curved mirror is a little larger than approximately 100 to 10,000 mm$^2$, which is not related to the shape of the opening.

As described above, the required area of the curved mirror is approximately 100 to 10,000 mm$^2$. In this case, when a through-hole into which the light guiding member is inserted is approximately 7 mm×7 mm, the area of the through-hole is 49 mm$^2$ and there is a great loss in reflection efficiency if the curved mirror is designed to be small in particular. Accordingly, as the curved mirror is smaller in size, the effect mentioned above is more remarkable.

On the other hand, an important region in the curved mirror is a region close to the light emitting body. Such a region of the curved mirror is irradiated with fluorescence emitted from the light emitting body with high density. Therefore, if reflection of a part of the curved mirror which part is irradiated with fluorescence with such density (i.e. bottom region) could not be used, efficiency in extracting fluorescence in the whole of the light emitting device would decrease greatly.

In view of the above, even if the curved mirror is large in size, it is possible to obtain the above effect.

[6. Another Expression of the Present Invention]

The present invention may be expressed also as follows.

The light emitting device of the present invention may be arranged such that the high-illuminance region includes a position where a ratio of radiation density of the fluorescence from the light emitting body to a distance between the light reflecting concave surface and the light emitting body is highest.

For example, in a case where radiation density of fluorescence from the light emitting body is isotropic (radiation density is constant), a position where the distance between the light reflecting concave surface and the light emitting body is shortest is a position where fluorescence from the light emitting body is incident with highest illuminance.

That is, the light emitting device of the present invention may be arranged such that the high-illuminance region includes a position where the distance between the light reflecting concave surface and the light emitting body is shortest.

On the other hand, in a case where radiation density of fluorescence from the light emitting body is anisotropic, the position where a ratio of radiation density of the fluorescence from the light emitting body to a distance between the light reflecting concave surface and the light emitting body is highest is a position where the fluorescence from the light emitting body is incident with highest illuminance on the light reflecting concave surface of the reflection mirror.

Further, the light emitting device of the present invention may be arranged such that the high-illuminance region is in the vicinity of a bottom of the light reflecting concave surface of the reflection mirror.

For example, in a case where the reflection mirror is a general parabolic concave mirror (hereinafter merely referred to as "parabola") and the light emitting body is provided at the focus of the parabola, when emitting illumination light in the front direction of the device (see z-axis direction in FIG. 1) in a normal use of the device, making as good as possible use of reflection at a region in the vicinity of the bottom of the reflection mirror (which may be hereinafter merely referred to as "bottom region") results in increase in efficiency in extracting fluorescence. For example, assume that a structure in which a through-hole is provided in the vicinity of a bottom of a reflection mirror, such as the light source device of Patent Literature 1 and the lamp of Patent Literature 2, is designed to have a light guiding member inserted into the through-hole. Such a structure could not fully use reflection at the bottom region of the reflection mirror at which region efficiency in extracting fluorescence (illumination light) is high.

For this reason, the light emitting device of the present invention is designed such that the through-hole is provided at a region outside the bottom region of the light reflecting concave surface of the reflection mirror.

Further, needless to say, the light emitting device of the present invention can subdue reduction in efficiency in extracting illumination light from the region in the vicinity of the bottom of the reflection mirror, compared with the headlamp of Patent Literature 3 in which a large part of the bottom of the reflection mirror does not exist.

As described above, with the above arrangement, the light emitting device of the present invention can subdue reduction in efficiency in extracting illumination light from the region in the vicinity of the bottom of the reflection mirror.

Further, the light emitting device of the present invention may be arranged such that the light guiding member is inserted into the through-hole toward the light emitting body in a direction extending along a vertical direction when the light emitting device is in a normal use.

In a case where the light emitting device of the present invention is used as a headlamp or a projector, it is unnecessary to project light (fluorescence) upwardly (see (a) of FIG. 4) or downwardly by a certain angle or more from a horizontal line on the screen. For this reason, in the above arrangement, the through-hole is provided at a region of the light reflecting concave surface which region would reflect light toward a non-illumination target area on the screen (region other than the bottom region), and the light guiding member is inserted into the through-hole. When the light guiding member is inserted into the through-hole in a direction extending along a vertical direction when the light emitting device is in a normal use, it is possible to achieve a headlamp or a projector which illuminates an illumination target area (including the direct front of the device) with high brightness and visibility and which has high efficiency in extracting illumination light.

For example, in a case where the light guiding member is inserted into the through-hole upwardly in a vertical direction, it is possible to achieve a headlamp of an automobile, a train, or a ship which is used in visually observing an obstacle on a ground, sea, or water and which emits, in substantially horizontal direction and a little downwardly in a vertical direction, illumination light with high brightness and visibility onto an illumination target area (including the direct front of the device).

Further, the light guiding member may be inserted downwardly in a vertical direction. In this case, a projector which projects illumination light on a screen in a substantially horizontal direction and a little upwardly in a vertical direction can project illumination light with high brightness and visibility onto an illumination target area on the screen (including the direct front of the device).

In a case where the reflection mirror has a parabolic shape, if a thorough-hole were provided at the bottom of the parabola and a light guiding member were inserted into the through-hole, there would be a possibility that the light guiding member cast a shadow on an illumination target area (including the direct front of the device). However, as described above, by providing a through-hole at a region other than the bottom region of the light reflecting concave surface and inserting a light guiding member in the through-hole in a direction extending along a vertical direction when the device is in a normal use, it is possible to solve a minor problem that the light guiding member casts a shadow on the illumination target area (including the direct front of the device).

"A direction in which the light guiding member is inserted extends along a vertical direction when the light emitting device is in a normal use" indicates not only a case where the direction in which the light guiding member is inserted and the vertical direction are completely equal to each other but also a case where the two directions are a little different from each other.

Further, the light emitting device of the present invention may be arranged such that the light guiding member is inserted into the through-hole toward the light emitting body in a direction forming an angle of not less than 15° and not more than 30° with respect to a vertical direction when the light emitting device is in a normal use.

For example, in a case of left-traffic countries such as Japan and the United Kingdom, light distribution characteristics required of a low beam are substantially those illustrated in (b) of FIG. 4 (which is based on the Japanese safety standard). That is, the headlamp is required to illuminate its front with a little amount of upward bias on the left.

Accordingly, by setting the angle θ (angle formed by direction in which light guiding member is inserted and vertical direction) to be, for example, not less than 15° and not more than 30° in FIG. 5, it is possible to meet conditions of two angles of a cutoff line required of a low beam (direct front part=30°, left part=15°, see (b) of FIG. 4).

In right-traffic countries such as U.S.A., Germany, and France, the positional relationship between right and left of the configuration in FIG. 5 for example should be reversed.

Further, the light emitting device of the present invention may be arranged such that the light reflecting concave surface of the reflection mirror has an elliptic opening whose long axis and short axis have different lengths, the light reflecting concave surface has parabolic cross sections when cut in planes vertical to the long axis and the short axis, respectively, and the long axis is along a horizontal direction when the light emitting device is in a normal use.

With the arrangement, a light spot of fluorescence (illumination light) formed on an illumination target area (including the direct front of the device) is narrow in a short axis direction and long in a long axis direction. This allows meeting light distribution characteristics required of a vehicle headlamp (see (a) of FIG. 4).

Further, the light emitting device of the present invention may be arranged such that the light guiding member is made of a material whose reflectance is larger than 1.

With the arrangement, the light guiding member is made of a material whose reflectance is larger than that of air (reflectance=1). Accordingly, excitation light can be guided in accordance with a fundamental principle that light is trapped in a region with high reflectance, without providing the outer surface of the light guiding member with a reflecting surface etc. for reflecting excitation light. This facilitates production of the light guiding member.

Further, the light emitting device of the present invention may be arranged such that the light guiding member guides excitation light incident to one end of the light guiding member to the other end so that the excitation light is radiated to the light emitting body, and the other end is smaller in cross sectional area than said one end.

Consequently, for example, even if there are a plurality of excitation light sources, respective excitation lights from the plurality of excitation light sources can be converged to the other end of the light guiding member which is smaller in cross sectional area than said one end.

Accordingly, by downsizing the cross sectional area of the other end of the light guiding member and the size of the light emitting body, it is possible to downsize the light emitting device that emits light with high luminance and high luminous flux according to the number of excitation light sources.

Further, an illuminating device including the light emitting device and a headlamp including the light emitting device are encompassed in the technical range of the present invention.

[Additional Note]

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a light emitting device, an illuminating device etc. For example, the present invention is applicable to a headlamp for an automobile, a headlamp for a vehicle or a moving object other than an automobile (e.g., human, ship, aircraft, submarine, rocket), or other illuminating devices. The other illuminating devices encompass, for example, a searchlight, a projector, a home illuminating device and like devices.

REFERENCE SIGNS LIST

11. LD chip (excitation light source)
21. Truncated pyramid light converging section (light guiding member)
40. Light emitting body
90. Mirror (reflection mirror)
90h. Through-hole
110. Headlamp (light emitting device, illuminating device, headlamp)
120. Headlamp (light emitting device, illuminating device, headlamp)
130. LED chip (excitation light source)
B. Position
θ. Angle (angle formed by direction in which light guiding member is inserted and vertical direction)
ER. Bottom region (high-illuminance region)
L0. Excitation light
L1. Illumination light (fluorescence)
SUF 1. Light reflecting concave surface

The invention claimed is:

1. A light emitting device, comprising:
an excitation light source for emitting excitation light;
a light emitting body for emitting fluorescence upon irradiation with the excitation light from the excitation light source; and
a reflection mirror including a light reflecting concave surface for reflecting the fluorescence from the light emitting body,
the light reflecting concave surface of the reflection mirror having a through-hole at a region other than a high-illuminance region that comprises a position where fluorescence from the light emitting body is incident with highest illuminance,
a light guiding member being inserted into the through-hole in order to guide the excitation light from the excitation light source to the light emitting body, and
an optical axis of the reflection mirror passing through the high-illuminance region.

2. The light emitting device as set forth in claim 1, wherein the high-illuminance region includes a position where a distance between the light reflecting concave surface and the light emitting body is shortest.

3. The light emitting device as set forth in claim 2, wherein the high-illuminance region is in a vicinity of a bottom of the light reflecting concave surface of the reflection mirror.

4. The light emitting device as set forth in claim 3, wherein the light guiding member is inserted into the through-hole toward the light emitting body in a direction extending along a vertical direction when the light emitting device is in a normal use.

5. The light emitting device as set forth in claim 3, wherein the light guiding member is inserted into the through-hole toward the light emitting body in a direction forming an angle of not less than 15° and not more than 30° with respect to a vertical direction when the light emitting device is in a normal use.

6. The light emitting device as set forth in claim 1, wherein the light reflecting concave surface of the reflection mirror has an elliptic opening whose long axis and short axis have different lengths, the light reflecting concave surface has parabolic cross sections when cut in planes vertical to the long axis and the short axis, respectively, and the long axis is along a horizontal direction when the light emitting device is in a normal use.

7. The light emitting device as set forth in claim 1, wherein the light guiding member is made of a material whose reflectance is larger than 1.

8. The light emitting device as set forth in claim 1, wherein the light guiding member guides excitation light incident to one end of the light guiding member to another end of the light guiding member so that the excitation light is radiated to the light emitting body, and
said another is smaller in cross sectional area than said one end.

9. An illuminating device, comprising a light emitting device as set forth in claim 1.

10. A headlamp, comprising a light emitting device as set forth in claim 1.

11. The light emitting device as set forth in claim 1, wherein the high-illuminance region is a region at which luminous flux from the light emitting body is incident with higher density than other region.

* * * * *